Patented Dec. 19, 1939

2,184,076

UNITED STATES PATENT OFFICE 2,184,076

PROCESS FOR THE PRODUCTION OF RUBBER SUBSTITUTE (FACTICE)

Edward Gottesmann, Jerusalem, Palestine, assignor, by mesne assignments, to Karl Werner Posnansky, New York, N. Y.

No Drawing. Original application March 22, 1935, Serial No. 12,518. Divided and this application October 9, 1936, Serial No. 104,900. In Germany March 26, 1934

12 Claims. (Cl. 260—399)

This is a division of my application Ser. No. 12,518, filed March 22, 1935 now Patent No. 2,152,185 for Process for Sulphurizing organic compounds having unsaturated linkages of an aliphatic character.

The present invention relates to a process for the production of solid or liquid rubber substitute (factice) by treating animal or vegetable fatty oils with hydrogen polysulphides.

The new process has many advantages over the methods hitherto usually employed for this purpose.

Hitherto, rubber substitute (factice) has generally been made by treating vegetable or animal fatty oils with sulphur by a hot method. The products obtained have the drawback of being rather strongly coloured (brown rubber substitute), which is unsatisfactory when employing them as an addition to light-coloured rubber goods.

Another process consists in treating the starting materials with sulphur chloride in the cold. Pale coloured products (white rubber substitute) are thereby produced. These products, however, contain chlorine, which is often undesirable in the subsequent treatment.

By proceeding according to the present invention, pale rubber substitute free from chlorine can be obtained.

It is preferable in the manufacture and use of the hydrogen polysulphides to work in the presence of stabilizing substances that act preferably by raising the surface tension, and the boiling points of which, if necessary, may lie even below that of the sulphurization temperature used. As such substances, halogenated-hydrocarbons, such as tetrachlorethane, methylene bromide, di-chlorethylenes, di-chlorethene, among others, have more especially proved satisfactory.

In the employment of hydrogen polysulphides, in the manufacture of rubber substitute, sulphur usually separates out. Rubber can be vulcanized with this substitute containing free reactive sulphur, the taking up of sulphur by the rubber occurring in a particularly favourable manner.

The process of the invention for the production of light coloured rubber substitute by treating the starting material with hydrogen polysulphides may also be used for obtaining partially sulphurized oils, which may either be employed as such, or further treated by one of the known processes (e. g., with the aid of sulphur monochloride) or by one of the processes forming the object of the invention. If, for example, a quantity of hydrogen polysulphides which is not sufficient for the production of a solid product is added to the oils, or the sulphurization reaction is interrupted prematurely, a thick, almost colourless oil or semi-solid product is obtained, from which any excess of sulphur present may be filtered off. This product may be employed as liquid or plastic rubber substitute, also, for example, in the manufacture of paints or impregnating media.

In the manufacture of rubber substitute the new process has the advantage that pale-coloured products are obtained which contain no chlorine, and are excellently adapted for the manufacture both of cold- and also hot-vulcanized pale-coloured rubber goods.

EXAMPLES

Example 1

35 kg. of a mixture of 90% raw hydrogen polysulphides and 10% of chlorinated aliphatic hydrocarbon, for instance tetrachlorethane, are slowly added to 100 kg. of rape seed oil at about 150° Calsius while actively stirring. The reaction is a fairly strongly exothermic one and takes place at this temperature in a very short time. The addition of the sulphurization mixture is adjusted according to the speed of consumption. The oil gradually becomes thicker, and solidifies finally to a rather rapidly hardening pale-yellow elastic mass, which contains varying quantities of free sulphur according to the purity of the hydrogen polysulphides employed. The lower limit of the free sulphur content amounts to about 8%. By the speed of adding the hydrogen polysulphides, the reaction can be so conducted that no development of hydrogen sulphide takes place and thus loss of this substance from the sphere of reaction is avoided.

Example 2

The same conditions are employed as in Example 1, but instead of 35 kg. only 25 kg. of the sulphurizing mixture is employed. In this case there is obtained on cooling a thick yellow oil, from which sulphur crystallizes out. The product, after filtering off the crystallized sulphur, can be again heated to about 145° Celsius and treated with a further 10–15 kg. of the sulphurizing mixture to form a rubber substitute, the free sulphur content of which amounts to 3% or under. The temperature is kept constant by external cooling until the mass slowly becomes thicker and then suddenly solidifies. The oil is allowed to complete the reaction whilst cooling slowly, and it is dealt with after the cooling like ordinary rubber substitute. A product almost colourless when ground is obtained and very transparent and of yellow colour in a thick layer, showing no reddish tone.

If the sulphur is not filtered from the thick oil first obtained, and if the heating is continued for a longer time, the sulphur is combined and gives a light brown colour. A pale brown rubber substitute is obtained. If, on the other hand, the further heating is carried out in the presence of hydrogen sulphide and catalysts, a very pale product is obtained.

I claim:

1. Process for the production of rubber substitute which consists in bringing about a reaction between unsaturated oil and hydrogen polysulphide.

2. Process for the production of rubber substitute which comprises bringing about a reaction between unsaturated oil and hydrogen polysulphides in presence of a stabilizing agent for said hydrogen polysulphides.

3. Process for the production of rubber substitute which comprises bringing about a reaction between unsaturated oil and hydrogen polysulphides in presence of a stabilizing agent for said hydrogen polysulphides which boils below the sulphurizing temperature.

4. The process of claim 3 in which the stabilizing agent is a chlorinated aliphatic hydrocarbon.

5. The process of claim 1 in which the temperature of reaction is above 100° C., however, below a value at which decomposition occurs.

6. Pale coloured rubber substitute which is free from chlorine, and obtained by reaction between an unsaturated oil and hydrogen polysulfide.

7. A method of making a rubber substitute which comprises adding hydrogen polysulphides to an unsaturated oil while stirring at a temperature at which a reaction between said substances occurs, interrupting the reaction before the oil is solidified, and filtering off any excess of sulphur.

8. A method of making a rubber substitute which comprises adding hydrogen polysulphides to an unsaturated oil while stirring at a temperature at which a reaction between said substances occurs, and adjusting the speed of adding said hydrogen polysulphides so as to prevent the development of escaping hydrogen sulphide.

9. A method of making a rubber substitute which comprises adding a quantity of hydrogen polysulphides to an unsaturated oil while stirring at a temperature at which a reaction between said substances occurs, filtering off any crystallized sulphur, heating the resulting mass to a reaction temperature, adding another quantity of hydrogen polysulphides, and keeping the reaction temperature constant by cooling until the resulting mass is solidified.

10. A rubber substitute of pale-yellow color containing free reactive sulphur and being free of chlorine and obtained by reaction between an unsaturated oil and hydrogen polysulphide.

11. A rubber substitute of pale-yellow color containing free reactive sulphur and hydrogen sulphide, and being free of chlorine, said substitute being obtained by reaction between an unsaturated oil and hydrogen polysulfide.

12. A rubber substitute of pale-yellow color containing hydrogen suphide and not less than 8% free reactive crystallized sulphur, and being free of chlorine, said substitute being obtained by reaction between an unsaturated oil and hydrogen polysulfide.

EDWARD GOTTESMANN.